United States Patent [19]

Le Creurer et al.

[11] Patent Number: 4,733,535

[45] Date of Patent: Mar. 29, 1988

[54] APPARATUS FOR DETERMINING THE EXHAUST VALVE TIMING OF AN ENGINE SUPERCHARGED BY A TURBO-COMPRESSOR

[75] Inventors: Maurice Le Creurer, Taverny; Marcel Sedille, Paris, both of France

[73] Assignees: Automobiles Peugeot, Paris; Automobiles Citroen, Neuilly S/Seine, both of France

[21] Appl. No.: 858,752

[22] Filed: May 2, 1986

[30] Foreign Application Priority Data

May 2, 1985 [FR] France .................. 85 06674

[51] Int. Cl.$^4$ ............................. F02B 37/00
[52] U.S. Cl. ..................... 60/605.1; 123/90.1
[58] Field of Search ............ 60/597, 598, 605; 123/90.1, 347

[56] References Cited

U.S. PATENT DOCUMENTS 2,858,666  11/1958  Fullemann .................... 60/605

FOREIGN PATENT DOCUMENTS

| 976926 | 8/1964 | Fed. Rep. of Germany . |
| 2022089 | 11/1971 | Fed. Rep. of Germany ........ 60/605 |
| 2021600 | 11/1971 | Fed. Rep. of Germany . |
| 2034312 | 1/1972 | Fed. Rep. of Germany ........ 60/605 |
| 2828020 | 1/1980 | Fed. Rep. of Germany ........ 60/605 |
| 765708 | 3/1934 | France . |
| 10112 | 1/1983 | Japan .................. 123/90.1 |
| 338872 | 11/1930 | United Kingdom . |
| 780621 | 8/1957 | United Kingdom .................. 60/597 |

Primary Examiner—Michael Koczo
Attorney, Agent, or Firm—Burns, Doane, Swecker & Mathis

[57] ABSTRACT

The camshaft of a turbocharged internal combustion engine is designed to account for the distance between each cylinder and the preceding cylinder in firing order. The camshaft is designed so that the exhaust valve of, say, cylinder number 4 opens at a sufficiently early time that the pressure pulse from opening of the preceding cylinder, say cylinder number 3, arrives at cylinder number 4 when cylinder number 4 is at a predetermined relationship to its top dead center position, where cylinder number 4 immediately follows cylinder number 3 in firing order. The angle at which an exhaust valve cam precedes its top dead center position is determined from the distance to the preceding cylinder through the exhaust system, the speed of sound, the engine speed at which optimization is desired, and the predetermined relationship.

3 Claims, 3 Drawing Figures

APPARATUS FOR DETERMINING THE EXHAUST VALVE TIMING OF AN ENGINE SUPERCHARGED BY A TURBO-COMPRESSOR

The present invention relates to internal combustion engines supercharged by turbo-compressors whose turbine is driven in rotation by the exhaust gases of the engine.

It is known that the conditions of the overall size of engines of automobile vehicles supercharged by turbo-compressors are such that the exhaust pipes between the engine and the turbine are usually short and their layout is sometimes difficult. These pipes are of relatively small volume and the pressure prevailing therein consequently fluctuates very much.

In particular, in the case of engines having four cylinders supercharged by a single turbo-compressor, the exhaust blasts produced in the manifolds result in disturbances which have an adverse effect on a correct feeding of the cylinders. This phenomenon will be explained in more detail in the course of the following description.

It is also known that there may be provided in an attempt to attenuate these negative effects, for an engine having four cylinders, two exhaust manifolds with which communicate two cylinders. As the ignition order is conventional, namely 1, 3, 4, 2, the cylinders 1 and 4 on one hand and 2 and 3 on the other are then grouped in pairs. The corresponding manifolds are of course united at the inlet of the turbine of the turbo-compressor.

However, even in such an arrangement, the exhaust blasts which are propagated along the manifolds also have a harmful influence on the filling of the various cylinders and, more generally, on the conditions of the admission of the mixture into the cylinders, so that the problem remains.

It is in addition indicated, in patent FR No. 765 708, that the control of the admission elements and/or the exhaust elements of the cylinders may be regulated in a different way, this measure being taken in conjunction with the fact that the exhaust pipes of certain cylinders are separated from the others up to the vicinity of the turbine of the turbo-compressor unit. However, such a vague indication as to the manner in which the exhaust means may be regulated does not effectively solve the aforementioned problem. A result which is the opposite of that required may even be obtained.

Therefore, an object of the invention is to solve the problems analysed hereinbefore and to attenuate, if not to eliminate, the harmful effect of the exhaust blasts on the operation of the engine.

For this purpose, the invention in particular provides a process for setting the exhaust valve timing of an internal combustion engine having a plurality of cylinders supercharged by at least one turbo-compressor whose turbine is driven by the exhaust gases of the engine, wherein the advance of the opening of the exhaust valves of the various cylinders is selected as a function of the length of the exhaust pipe portion between each cylinder and the preceding cylinder, in the ignition order.

According to other features of the invention:

This selection of the advance of exhaust valve opening is such that the waves of the exhaust blasts of each cylinder reach the preceding cylinder, in the ignition order, with a stagger in time which is roughly constant with respect to the top dead centre of said preceding cylinder for a given engine operating speed.

This stagger being represented by a variation $\Delta\alpha$ of the angular position of a cam carried by a camshaft and actuating the exhaust valve of a given cylinder, this stagger is chosen in the following manner:

$$\Delta\alpha = (L/C) \times 6N$$

in which:
- L is the length of the exhaust pipe portion between the given cylinder and the preceding cylinder in the ignition order;
- C is the velocity of sound, and
- N is the speed of the engine in rpm for which an optimum result is desired.

The invention also provides an internal combustion engine having a plurality of cylinders supercharged by at least one turbo-compressor whose turbine is driven by the exhaust gases of the engine, and provided with a given timing device, e.g. a conventional camshaft, determining, in particular, the instant of the opening of the exhaust valves of the various cylinders, wherein the timing device is so arranged that the advance of the opening of the exhaust valves of the various cylinders is selected as a function of the length of the exhaust pipe portion between the considered cylinder and the preceding cylinder, in the ignition order.

The other features of the process mentioned hereinbefore are of course applicable to such an engine.

The invention will be described in more detail hereinafter with reference to the accompanying drawing which is given merely by way of example and in which.

Figure 1:
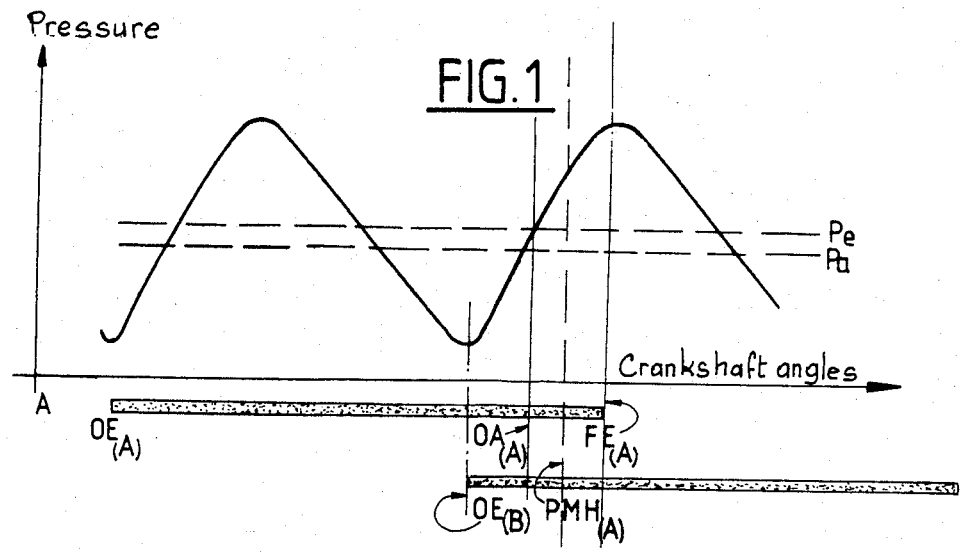
FIG. 1 is a diagram explaining the terms of the problem to be solved and the proposed solution.

FIG. 1 is a diagram of the pressures as a function of the angular position of the crankshaft in an exhaust manifold between an engine M and a turbine T of a turbo-compressor driven by the exhaust gases of this engine. In respect of a cylinder A, the exhaust stage extends from $OE_{(A)}$ (opening of the exhaust valve) to $FE_{(A)}$ (closure of this valve), which is located a little beyond the upper dead centre $PMH_{(A)}$ of this cylinder. At the beginning of the exhaust, the pressure rapidly increases owing to the well-known blast effect. It passes through a maximum, then decreases to the opening of $OE_{(B)}$ of the exhaust valve of the following cylinder B in the timing order. The pressure then rises, as before.

In respect of cylinder A, the opening of the admission valve $OA_{(A)}$ starts a little before its upper dead centre so that, during a certain period of time, there is an overlapping of the valves which establishes a direct communication between the admission manifold and the exhaust manifold.

It is moreover known that, in respect of fast engines corresponding to the engines of automobile vehicles, the advance of the opening of the exhaust valves is usually rather large so that the point $OE_{(B)}$ greatly precedes the point $PMH_{(A)}$.

Taking into account the conventional values of the advances of the exhaust opening, at the moment of the crossing of the valves, the exhaust pressure $P_{(e)}$ is generally higher than the air feed pressure $P_{(a)}$ provided by the compressor. During this interval of time, there is a flow of the gases which travels from the exhaust to the admission through the two valves and the end of the cylinder.

At the moment of the closure of the exhaust valve, the cylinder end then contains burnt gases at high pressure and temperature, and a portion of the burnt gases occupies a certain volume in the admission pocket. When the admission is continued, the burnt gases contained in the end of the cylinder first of all expand, then the volume of the burnt gases contained in the admission pocket is aspirated before the cold air is admitted into the cylinder. There is then found a reduction in the filling coefficient and an increase in the mean temperature at the end of the admission which is harmful and which increases the risks of detonation in gasoline engines in particular.

Figure 2:
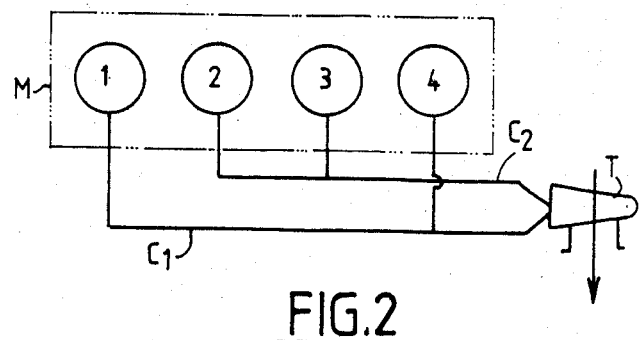
FIGS. 2 and 3 are two diagrams showing two arrangements of known type of the exhaust pipes of an internal combustion engine having a turbo-compressor.

If there is considered the arrangement shown in FIG. 2 which diagrammatically represents by its four cylinders 1, 2, 3, 4, an internal combustion engine M supercharged by a turbo-compressor, it can be seen that the exhaust manifold is so arranged as to group the cylinders in pairs so that two successive cylinders in the ignition order exhaust into different exhaust pipes. As the ignition order is assumed to be 1, 3, 4, 2, the cylinders 1 and 4 on one hand and 2 and 3 on the other are grouped together and communicate with the two manifolds $C_1$, $C_2$ which are united at the inlet of the turbine T of the turbo-compressor.

It can be seen from the diagram of FIG. 2 that the length $L_i$ of the exhaust pipe portion between a given cylinder i and the preceding cylinder in the ignition order is different for each pair of cylinders: $L_4 < L_2 < L_3 < L_1$.

According to the invention, the advance of the exhaust opening is set for each of the cylinders as a function of the length that the blast wave must travel through from the considered cylinder to reach the preceding cylinder in the ignition order. This setting is carried out in the known manner by suitably disposing the cams on the camshaft and/or by choosing the profile of these cams in consequence.

Thus, in the case of FIG. 2, the advance of the exhaust opening of the four cylinders is in the following order:

$$AOE_4 < AOE_2 < AOE_3 < AOE_1.$$

The corresponding differences are preferably on the same order of magnitude as the quantities:

$$\Delta\alpha_{ij} \sim \frac{L_i - L_j}{C} \times 6N$$

In these formulae N is the speed of the engine in rpm in respect of which an optimum result is desired to be obtained; this speed may be chosen as desired between the idling speed and the maximum speed, depending on the destination of the engine.

Such a stagger in the advances of the exhaust opening has for result that the waves of the exhaust blasts of the various cylinders reach the valves of the cylinders that precede them in the ignition order roughly at the same instant with respect to the upper dead centre of the cylinders for the speed N of the engine.

It will be understood that for a different value of N, this property is no longer strictly exact, but at the upper dead centre position the pressure prevailing in the exhaust pipe remains in the neighbourhood of the minimum and the drawbacks related to a high value of this pressure nonetheless disappear. The choice of the speed N to be taken into account in the foregoing formula may then be such as to avoid these drawbacks and in particular the counter-scavengings for all these cylinders at the most useful operating speeds and above all in the neighbourhood of the maximum speed.

By way of example:
If
$L_4 = 0.30$ m,
$L_2 = 0.36$ m,
$L_1 = 0.54$ m,
$L_3 = 0.48$ m,
by choosing $N = 5000$ rpm,
knowing that $C = 600$ m/s,
there is obtained
$\Delta\alpha_4 = 15°$,
$\Delta\alpha_2 = 18°$,
$\Delta\alpha_1 = 27°$,
$\Delta\alpha_3 = 24°$.

The following values for the advances of the exhaust opening are obtained by adding the angular differences computed above to, for example, 8° before top dead center:
$AOE_4 = 23°$,
$AOE_2 = 26°$,
$AOE_1 = 35°$,
$AOE_3 = 32°$,
or values close to these values and, under these conditions, the minimum of the curve which gives the exhaust pressure at the outlet of a cylinder will be located substantially 8° before the upper dead centre of this cylinder.

Figure 3:
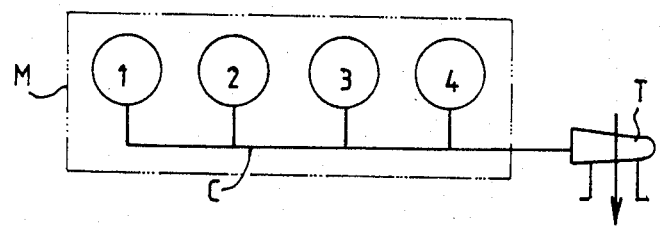

It must be understood that the invention is applicable irrespective of the arrangement of the exhaust pipes of the engine and in particular to a more conventional arrangement, such as that shown in FIG. 3. The staggers of the exhaust openings are of course correspondingly adapted to take into account the exhaust pipe lengths between the various cylinders.

In all the configurations, the carrying out of the invention eliminates to a very large extent the drawbacks analysed hereinbefore and improves the conditions of the filling of the cylinders and consequently the efficiency of the engine.

What is claimed is:
1. An internal combustion engine comprising a plurality of cylinders having an ignition order, each cylinder having inlet and exhaust valves and an exhaust pipe, at least one turbo-compressor having a turbine which communicates with the exhaust pipes of the cylinders and is driven by the exhaust gases of the engine, and a timing means for opening the exhaust valves of the various cylinders, the timing means being operable to open each exhaust valve with an angular advance related to the length of an exhaust pipe portion between each cylinder and the preceding cylinder in the ignition order.

2. An engine according to claim 1, wherein said advance of the exhaust valve opening determined in relation to the length of the exhaust pipe portion between each cylinder and the preceding cylinder in ignition order is further selected to allow waves of exhaust blasts of each cylinder reach the preceding cylinder, in the ignition order, with a stagger in time which is roughly constant relative to an upper dead centre condition of said preceding cylinder for a given operating speed of the engine.

3. An internal combustion engine comprising:

a plurality of cylinders having an ignition order, each cylinder having inlet and exhaust valves and an exhaust pipe, at least one turbo-compressor having a turbine which communicates with the exhaust pipes of the cylinders and is driven by the exhaust gases of the engine, and a timing means for determining the instant of the opening of the exhaust valves of the various cylinders, the timing means being so arranged that an advance of the opening of the exhaust valves of the various cylinders is determined in relation to the length of an exhaust pipe portion between each cylinder and the preceding cylinder in the ignition order;

wherein said advance of the exhaust valve opening determined in relation to the length of the exhaust pipe portion between each cylinder and the preceding cylinder in ignition order is selected to allow waves of exhaust blasts of each cylinder reach the preceding cylinder, in the ignition order, with a stagger in time which is roughly constant relative to an upper dead centre condition of said preceding cylinder for a given operating speed of the engine; and wherein the timing means is a camshaft and wherein the stagger is represented by a variation $\Delta\alpha$ of the angular position of a cam carried by the camshaft and controlling a corresponding exhaust valve of a given cylinder, this stagger is chosen in the following manner:

$$\Delta\alpha = (L/C) \times 6N$$

in which:

L is the length of the exhaust pipe portion between the given cylinder and the preceding cylinder in the ignition order;

C is the velocity of sound, and

N is the speed of the engine in rpm in respect of which an optimum result is desired.

* * * * *